Patented Jan. 10, 1950

2,493,975

UNITED STATES PATENT OFFICE 2,493,975

TRISAZO-DYESTUFFS

Otto Kaiser, Dornach, Switzerland, assignor to Ciba Limited, Basel, Switzerland, a Swiss firm No Drawing. Application May 29, 1946, Serial No. 673,171. In Switzerland June 21, 1945

4 Claims. (Cl. 260—153)

In U. S. Patent Application Serial No. 480,371, filed March 24, 1943, now Patent No. 2,435,356, are described, inter alia, trisazo-dyestuffs obtained by coupling a diazotized disazo-dyestuff of the general formula

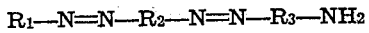

in which $R_1$ represents the radical of an aminosalicylic acid, and $R_2$ and $R_3$ represent the radicals of middle components, with a derivative of a 2 - amino-5-hydroxynaphthalene - 7 - sulfonic acid, of which the amino-group is connected directly or indirectly by means of a —CO— or heterocyclic bridge to the radical of an aminosalicylic acid. The resulting dyestuffs, which yield on cellulose such as cotton or regenerated cellulose direct dyeings of very good properties of wet fastness after development with agents yielding copper, are characterized by the presence of two salicylic acid radicals.

The present invention is based on the unexpected observation that trisazo-dyestuffs, of which the dyeings can be after-treated with agents yielding copper with equally good results, notwithstanding that the dyestuffs contain only one salicylic acid radical, can be obtained by coupling a diazo-compound of a disazo-dyestuff of the general formula

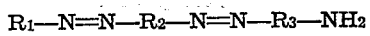

in which $R_1$ represents a benzene nucleus containing in 4-position with respect to the —N=N— linkage a hydroxyl group and in ortho-position with respect to the said hydroxyl group a carboxyl group, and, if desired, containing further substituents, and $R_2$ and $R_3$ represent naphthalene nuclei in which the —N=N— linkage and the —NH$_2$ group are in the 1:4-position relatively to one another, with a condensation product of 1 molecular proportion of a cyanuric halide and 1 molecular proportion of 2-amino-5-hydroxynaphthalene-7-sulfonic acid, in which condensation product at least one of the remaining halogen atoms has been reacted with an aromatic amine of the benzene series not containing the characteristic atomic grouping of salicylic acid. Especially valuable are the products in which both of the remaining halogen atoms have been reacted in the aforesaid manner.

In a modification of the above process the new dyestuffs are made by first coupling a diazo-compound of a disazo-dyestuff of the above general formula with 2-amino-5-hydroxynaphthalene-7-sulfonic acid in such manner that coupling occurs in the 6-position, which is brought about in known manner by conducting the reaction in a neutral or alkaline medium, and then causing the resulting trisazo-dyestuff to react with a cyanuric halide and at least one aromatic amine of the kind defined above.

As dyestuffs of the general formula

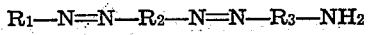

there come into consideration, for example, dyestuffs of the following formulae (I)

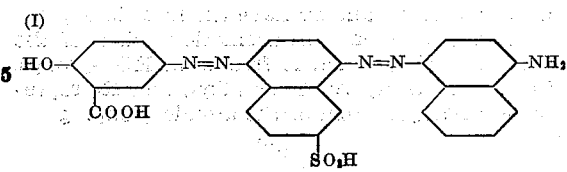

(II)

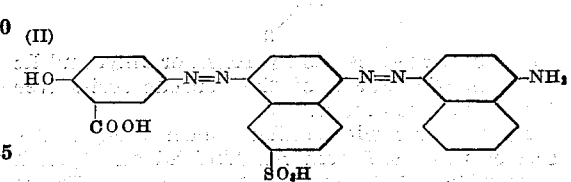

(III)

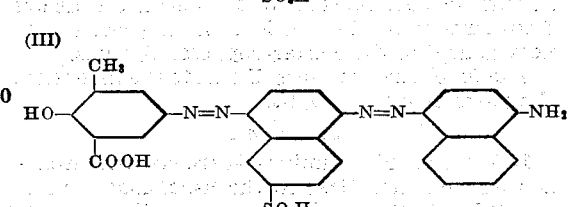

(IV)
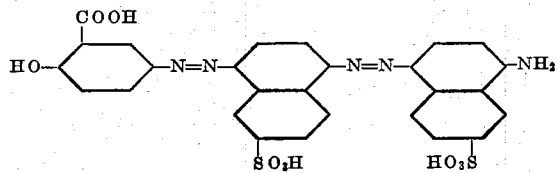

As aromatic amines which are caused to react with the two remaining halogen atoms of the cyanuric halide there come primarily into consideration 1-aminobenzene and its 3- or 4-sulfonic acid, and derivatives thereof substituted in the nucleus by chlorine or bromine or methyl, methoxy or ethoxy groups; N-monomethylaminobenzene; and also carboxylic acids of such compounds, for example, 1-aminobenzene-3-carboxylic acid and the like.

Care must be taken so to select the various starting materials that the final products contain, on the one hand, sufficient sulfo groups or carboxyl groups to possess adequate solubility, and, on the other, not so many sulfo groups as to impair the dyeing capacity and properties of fastness of the final dyestuffs. The new dyestuffs may with advantage contain 3 sulfo groups, but may alternatively contain 2 or 4 sulfo groups, of which groups one or two are present in the azo-dyestuff of the general formula

and one or two in the condensed aminonaphthol radical.

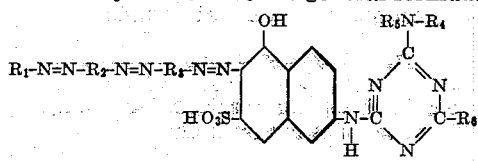

The new dyestuffs have the general formula:
(V)
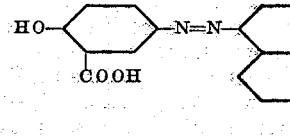

in which $R_1$, $R_2$ and $R_3$ have the meanings given above, $R_4$ represents an aromatic nucleus of the benzene series, which is free from HO—groups, $R_5$ represents hydrogen or alkyl, and $R_6$ represents a halogen atom or the atomic grouping

in which $R_7$ represents hydrogen or alkyl and $R_8$ an aromatic radical of the benzene series free from hydroxyl groups.

As compared with similar known dyestuffs described in U. S. Patent No. 2,215,087 and French Patent No. 861,674, some of the new dyestuffs are distinguished by the considerably improved fastness to acid of their after-coppered dyeings.

The following examples illustrate the invention, the parts being by weight:

Example 1

15.3 parts of 1-amino-3-carboxy-4-hydroxybenzene are diazotized in the usual manner and coupled at 0° C. in the presence of sodium acetate with 22.3 parts of 1-naphthylamine-7-sulfonic acid dissolved in 200 parts of water in the form of its sodium salt. The monoazo-dyestuff which separates is then brought into solution with aqueous caustic soda solution, mixed with 6.9 parts of sodium nitrite in the form of a solution of 25 per cent. strength, and the mixture is run into a mixture of 200 parts of ice-water and 50 parts of concentrated hydrochloric acid.

The diazotization is conducted at 0–5° C. and when it is complete, the diazo-compound is precipitated by means of sodium chloride and then separated with suction. It is then coupled with 14.3 parts of 1-naphthylamine dissolved in 12 parts of concentrated hydrochloric acid and 150 parts of warm water. During the coupling 20 parts of sodium acetate are strewn in, and the product is precipitated after a short time by the addition of sodium chloride. It is brought into solution with a small quantity of caustic soda solution, mixed with 6.9 parts of sodium nitrite in the form of a solution of 25 per cent. strength, and the whole is diazotized at 15° C. with a mixture of 200 parts of ice-water and 50 parts of concentrated hydrochloric acid. The diazo-compound is separated with suction, and then coupled with 58 parts of the ternary triazine condensation product obtained in known manner from 1 molecular proportion of cyanuric chloride, 1 molecular proportion of 2-amino-5-hydroxynaphthalene-7-sulfonic acid, 1 molecular proportion of 1-aminobenzene-3-sulfonic acid and 1 molecular proportion of aniline, the said condensation product being in a solution rendered alkaline with sodium carbonate.

When coupling is finished the dyestuff, which corresponds in the free state to the formula

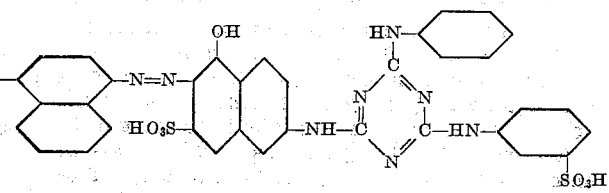

is separated and dried. It is a dark powder which dyes cotton in a weakly alkaline bath in the presence of copper sulfate and sodium tartrate grey tints which are fast to washing.

In this example there may be used, instead of 1-naphthylamine-7-sulfonic acid, 1-naphthylamine-6-sulfonic acid or the commercial mixture of 1-naphthylamine-6-sulfonic acid and 1-naphthylamine-7-sulfonic acid. Moreover, in the tertiary triazine condensation product 1 molecular proportion of aniline may be replaced by 1 molecular proportion of N-monomethylaniline.

Example 2

15.3 parts of 1-amino-3-carboxy-4-hydroxybenzene are diazotized in the usual manner and coupled at 0° C. in presence of sodium acetate with 22.3 parts of 1-napthylamine-7-sulfonic acid dissolved in the form of its sodium salt in 200 parts of water. The separated dyestuff is then brought into solution by means of aqueous caustic soda solution, mixed with 6.9 parts of sodium nitrite in the form of an aqueous solution of 25 per cent. strength, and the whole is allowed to run into a mixture of 200 parts of ice-water and 50 parts of concentrated hydrochloric acid. When the diazotization, which is carried out at 0–5° C., is finished, the diazo-compound is precipitated by means of sodium chloride, separated by filtering with suction, and coupled with a further 22.3 parts of 1-naphthylamine-7-sulfonic acid dissolved in 200 parts of water in the form of its sodium salt. During the coupling 20 parts of sodium acetate are strewn in, and the product is precipitated after a short time with sodium chloride. It is brought into solution with a small quantity of caustic soda solution, mixed with 6.9 parts of sodium nitrite in the form of a solution of 25 per cent. strength, and the mixture is diazotized at 15° C. by means of a mixture of 200 parts of ice-water and 50 parts of concentrated hydrochloric acid. The precipitated diazo-compound is then coupled with 44.3 parts of the secondary triazine condensation product obtained in known manner from 1 molecular proportion of cyanuric chloride, 1 molecular proportion of 2-amino-5-hydroxynaphthalene - 7 - sulfonic acid and 1 molecular proportion of aminobenzene, the condensation product being in a solution rendered alkaline with sodium carbonate.

When the coupling is finished the dyestuff, which corresponds in the free state to the formula is separated and dried. It is a dark powder

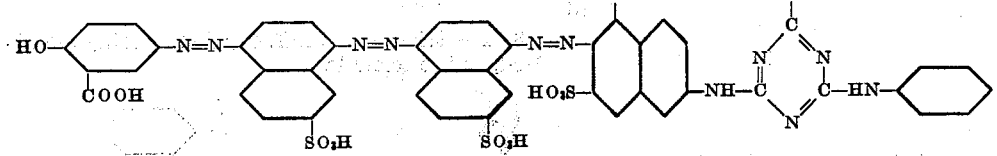

which dyes cotton from a weakly alkaline bath in the presence of copper sulfate and sodium tartrate grey tints which are fast to washing. A similar dyestuff is obtained when 1-napthylamine-7-sulfonic acid is replaced once or twice by 1-naphthylamine-6-sulfonic acid or by a commercial mixture of both acids. A dyestuff dyeing somewhat greenish grey tints is obtained by replacing in the present example the secondary triazine condensation product by the tertiary triazine condensation product of the first paragraph of the foregoing Example 1.

Other dyestuffs of the invention can be obtained by the procedures described in the preceding Examples 1 and 2 with the aid of the diazo-compounds of the disazo-dyestuffs of the Formulae I—IV hereinbefore given. When disazo-dyestuffs which contain two sulfo-groups are chosen are starting dyestuffs, there are advantageously used as coupling components secondary or ternary condensation products which contain only one or at most two sulfo-groups, that is to say compounds of the general formula

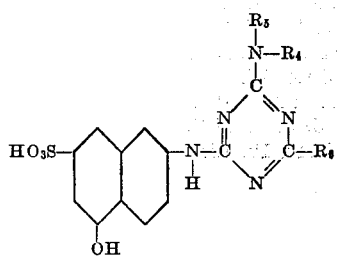

in which $R_6$ represents halogen or a group

in which $R_4$ and if desired $R_8$ represent benzene nuclei, which are free from hydroxyl groups and of which at most one may contain not more than 1 sulfo-group, and $R_5$ and if desired $R_7$ represent alkyl or hydrogen. The atomic grouping

may thus represent the radical of aniline, of monomethylaniline, of monoethylaniline, of monomethyl-meta-toluidine, or ortho-, para- or meta-toluidine, of ortho- or para-anisidine or -phenetidine, or of meta- or para-chloraniline; this applies also to the radical

Moreover $R_4$ and $R_5$ may also contain a sulfo-group. In the latter case the groups

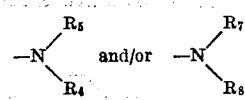

represent the radicals of amino-sulfonic acids of the benzene series, such as 1-aminobenzene-3-sulfonic acid, 1-aminobenzene-4-sulfonic acid, 1-amino-2-methoxybenzene-4-sulfonic acid, 1-amino-2-methylbenzene-5-sulfonic acid, 1-amino-4-methylbenzene-3-sulfonic acid and the like. In the case of disazo-dyestuffs which contain only one sulfo-group, there are advantageously used secondary or ternary condensation products which contain two sulfo-groups; but the use of condensation products having only one sulfo-group is not excluded. For example, such secondary or ternary condensation products having two sulfo-groups, such as the product of the formula

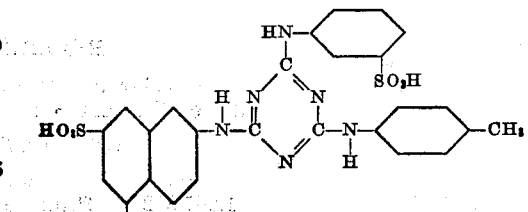

or having a single sulfo-group such as the product of the formula

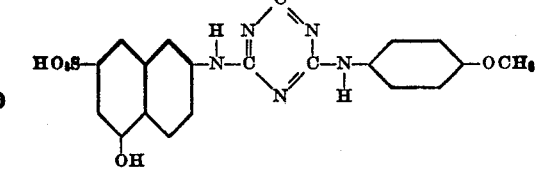

may be used.

What I claim is:

1. A trisazo-dyestuff, capable of being metallized, of the formula

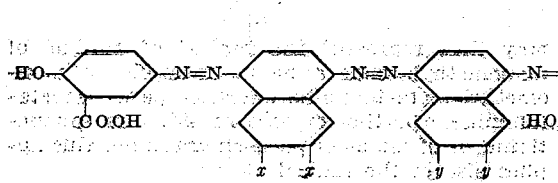
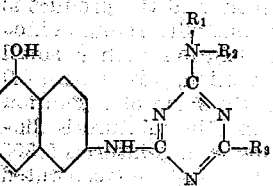

in which $R_1$ stands for a member of the group consisting of hydrogen and an alkyl radical, $R_2$ for an aromatic nucleus of the benzene series free from hydroxy and carboxylic acid groups and $R_3$ for a member of the group consisting of chlorine and the residue of an aromatic amine of the benzene series free from hydroxy and carboxylic acid groups and linked with its nitrogen atom to the triazine ring, in which further one $x$ represents a sulfonic acid group and the other $x$ and one $y$ represent hydrogen atoms, and the other $y$ represents a member of the group consisting of hydrogen and a sulfonic acid group.

2. The trisazo-dyestuff, capable of being metallized, of the formula

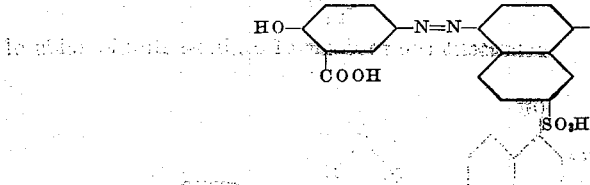

3. The trisazo-dyestuff, capable of being metallized, of the formula

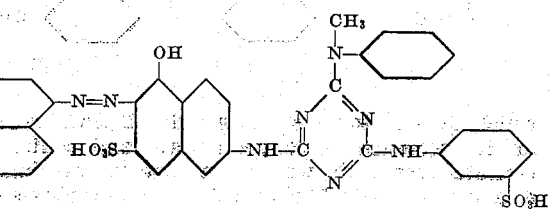

4. The trisazo-dyestuff, capable of being metallized, of the formula

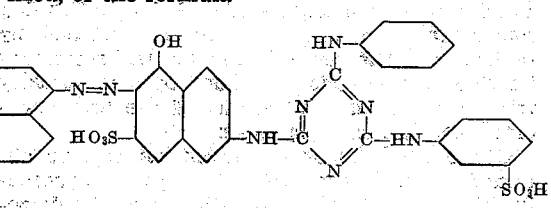

OTTO KAISER.

REFERENCES CITED

The following references are of record in the file of this patent:

UNITED STATES PATENTS

| Number | Name | Date |
|---|---|---|
| 1,667,312 | Fritzche et al. | Apr. 24, 1928 |
| 1,788,295 | Hentrich et al. | Jan. 6, 1931 |
| 2,084,731 | Gyr et al. | June 22, 1937 |
| 2,215,087 | Schweitzer | Sept. 17, 1940 |
| 2,268,919 | Anderau | Jan. 6, 1942 |
| 2,270,675 | Stein et al. | Jan. 20, 1942 |
| 2,396,659 | Kaiser | Mar. 19, 1946 |

Certificate of Correction

Patent No. 2,493,975 January 10, 1950

OTTO KAISER

It is hereby certified that errors appear in the printed specification of the above numbered patent requiring correction as follows:

Column 3, line 33, for that portion of the formula reading "R₁N" read $R_1-N$; column 5, line 22, strike out "is separated and dried. It is a dark powder", and insert the same before the word "which" in line 34, same column; lines 37 and 38, for "1-napthylamine" read *1-naphthylamine*;

and that the said Letters Patent should be read with these corrections therein that the same may conform to the record of the case in the Patent Office.

Signed and sealed this 25th day of April, A. D. 1950.

[SEAL]

THOMAS F. MURPHY,
*Assistant Commissioner of Patents.*